Patented Aug. 4, 1931

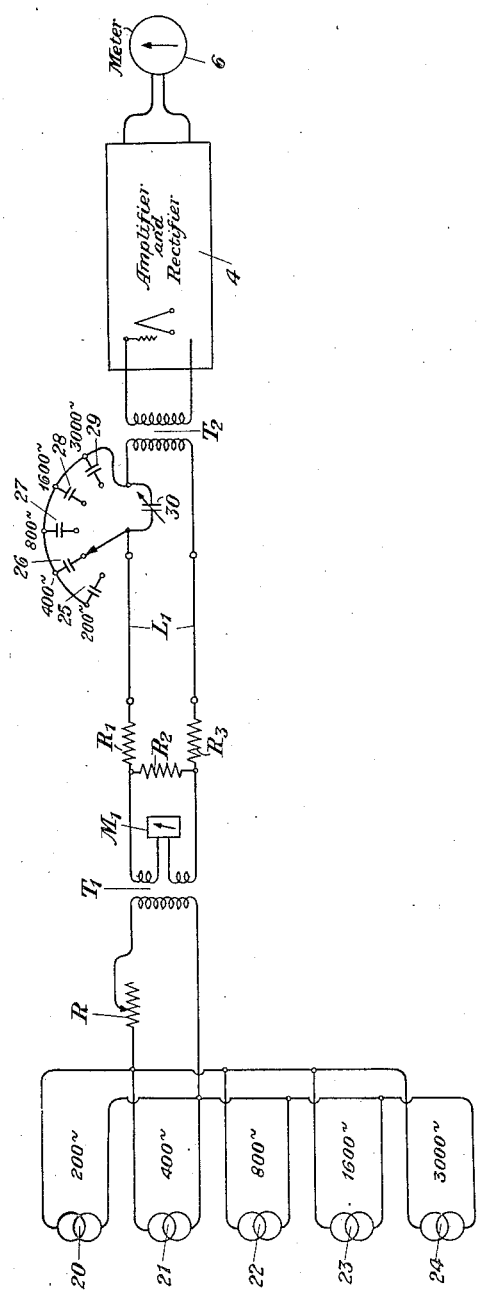

1,816,958

UNITED STATES PATENT OFFICE

ALVA B. CLARK, OF WYOMING, AND FRED H. BEST, OF WESTFIELD, NEW JERSEY, ASSIGNORS TO AMERICAN TELEPHONE AND TELEGRAPH COMPANY, A CORPORATION OF NEW YORK

TRANSMISSION MEASURING SYSTEM

Original application filed April 5, 1927, Serial No. 181,244, Patent No. 1,746,241, dated February 11, 1930. Divided and this application filed August 23, 1929. Serial No. 387,994.

This invention relates to transmission measuring systems and particularly to means for readily indicating or recording the transmission equivalent of a circuit at a plurality of frequencies.

This is a division of the copending application of Clark and Best, Serial No. 181,244, filed April 5, 1927, that issued as Patent 1,746,241, Feb. 11, 1930, and is intended to specifically cover Figure 2 of the said patent.

Various systems have been proposed and used heretofore to determine the transmission equivalent of a circuit. Such systems have been designed to give very accurate results and require skill in their operation.

The object of this invention is to provide a system that will indicate or record the transmission equivalent of a circuit at various frequencies, the said system being characterized by greater simplicity of operation than the devices of the prior art.

Other objects of this invention will be apparent from the following description when read in connection with the attached drawing which shows a form of the invention characterized by the simultaneous application of a plurality of frequencies.

In the arrangement shown in the drawing, a plurality of oscillators, of which five designated 20 to 24, have been shown for the purpose of illustrating the invention, are connected across the primary winding of the transformer $T_1$. The secondary is connected with the sending network $R_1$—$R_2$—$R_3$ which simulates the impedance of the line with which it is connected. At the opposite end of the line $L_1$ a plurality of condensers are connected or adapted to be connected with the primary of the transformer $T_2$ for the purpose of tuning it to a particular frequency the method of doing which will be described hereinafter. The circuit is connected by the transformer $T_2$ with an amplifier and rectifier 4, the output side of which is connected with a meter 6. This meter is calibrated to read directly the transmission equivalent of the line $L_1$.

The manner in which this arrangement is operated to determine the transmission equivalent of the circuit $L_1$ is as follows: By means of the resistance R and the meter $M_1$ the voltage applied by the oscillators across the sending network $R_1$—$R_2$—$R_3$ is adjusted to a given value. Then the condensers 25 to 29 inclusive are successively connected with the line for the purpose of tuning the transformer to a particular frequency; thus when 25 is connected the transformer will be tuned to say 200 cycles. In like manner each of the other condensers will tune the transformer to one of the other frequencies transmitted. Fine adjustment of tuning is obtained by varying the condenser 30. This small condenser avoids the necessity of adjusting to a high degree of accuracy the condensers connected with the dial switch. When the transformer has been tuned to resonance, it will be indicated by the position of the needle of the meter 6 which should stand at its maximum when resonance exists. The reading given by the meter 6 indicates the transmission equivalent of the circuit $L_1$ at that frequency. In like manner the equivalents for each frequency throughout the range of frequencies produced by the oscillators 20 to 24 inclusive, may be obtained.

While the invention has been disclosed as embodied in a particular form, it is of course obvious that the underlying principle may assume other forms without departing from the spirit and scope of the appended claims.

What is claimed is:

1. In a transmission measuring system, the combination with a circuit whose transmission equivalent is to be measured, of a source of electrical oscillations connected with the said circuit, the said source being capable of impressing upon the said circuit a plurality of discrete frequencies, means connected with the said circuit to tune it for each of said frequencies, and means also connected with said circuit to indicate the transmission equivalent thereof at each frequency transmitted.

2. In a transmission measuring system, the combination with a circuit whose transmission equivalent is to be measured, of a plurality of sources of electrical oscillations connected with the said circuit, each source producing a frequency differing from those produced by the other sources, means connected with the said circuit to tune it for each of said frequencies, and means also connected with the said circuit to indicate the transmission equivalent thereof at each frequency transmitted.

3. In a transmission measuring system, the combination with a circuit capable of having its tuning changed at will, of a source of a plurality of discrete frequencies lying within the band of frequencies for which the said circuit may be tuned, and an indicating device also connected with the said circuit to show the transmission equivalent thereof at each of the frequencies transmitted thereover.

4. In a transmission measuring system, the combination with a circuit, whose transmission equivalent is to be measured, of a source of electrical oscillations connected therewith, the said source being capable of impressing a plurality of discrete frequencies upon said circuit, a group of condensers, means to selectively connect each of said condensers to said circuit to tune it for one of the frequencies produced by said source, and means also connected with said circuit to indicate the transmission equivalent of the circuit at the frequency transmitted thereover at any instant.

5. In a transmission measuring system, the combination with a circuit, whose transmission equivalent is to be measured, of a source of electrical oscillations connected therewith, the said source being capable of impressing a plurality of discrete frequencies upon said circuit, a group of condensers, means to selectively connect each of said condensers to said circuit to tune it for one of the frequencies produced by said source, means connected with said circuit to amplify and rectify said oscillations, and a direct current responsive device connected with said rectifier to indicate the transmission equivalent of the circuit at the frequency transmitted at any instant.

In testimony whereof, we have signed our names to this specification this 22nd day of August, 1929.

ALVA B. CLARK.
FRED H. BEST.